(12) United States Patent
Lacourba et al.

(10) Patent No.: US 10,855,609 B2
(45) Date of Patent: Dec. 1, 2020

(54) INTERCONNECT AND METHOD OF OPERATION OF SUCH AN INTERCONNECT

(71) Applicant: Arm Limited, Cambridge (GB)

(72) Inventors: Geoffray Matthieu Lacourba, Nice (FR); Alex James Waugh, Cambridge (GB)

(73) Assignee: Arm Limited, Cambridge (GB)

( * ) Notice: Subject to any disclaimer, the term of this patent is extended or adjusted under 35 U.S.C. 154(b) by 10 days.

(21) Appl. No.: 16/269,740

(22) Filed: Feb. 7, 2019

(65) Prior Publication Data
US 2020/0259756 A1 Aug. 13, 2020

(51) Int. Cl.
*H04L 12/437* (2006.01)
*H04L 12/801* (2013.01)
*H04L 12/933* (2013.01)

(52) U.S. Cl.
CPC ............ *H04L 47/34* (2013.01); *H04L 49/102* (2013.01)

(58) Field of Classification Search
None
See application file for complete search history.

(56) References Cited

U.S. PATENT DOCUMENTS

| | | | |
|---|---|---|---|
| 2004/0258088 A1* | 12/2004 | Clark | H04L 47/2441 370/465 |
| 2005/0276274 A1* | 12/2005 | Mattina | H04L 12/427 370/403 |
| 2012/0131130 A1* | 5/2012 | Field | H04L 12/4035 709/217 |
| 2014/0351419 A1* | 11/2014 | Hunt | H04L 43/08 709/224 |
| 2015/0295635 A1* | 10/2015 | Koskiahde | H04L 12/2863 370/315 |

(Continued)

*Primary Examiner* — Brandon M Renner
(74) *Attorney, Agent, or Firm* — Nixon & Vanderhye P.C.

(57) ABSTRACT

An interconnect is provided that has a plurality of nodes, and a ring network to which each of the nodes is connected to allow packets to be transmitted between nodes. For an ordered sequence of packets one of the nodes is arranged as a source node to add each packet of the ordered sequence on to the ring network, and another of the nodes is arranged as a destination node to remove each packet of the ordered sequence from the ring network. The source node is enabled to add a packet of the ordered sequence on to the ring network without waiting for a previously added packet of the ordered sequence to be removed from the ring network by the destination node. When the destination node is unable to accept a given packet of the ordered sequence that is currently being presented to the destination node by the ring network, that given packet remains on the ring network and continues to be transmitted around the ring network such that after a respin period that given packet will be presented again to the destination node. The destination node is then arranged to prevent acceptance of at least any other packets of the ordered sequence subsequently presented to the destination node by the ring network until the destination node has accepted the given packet following at least one respin period. This can improve the efficiency of the ring network in the handling of ordered sequences of packets, whilst still ensuring the ordering constraints are met.

16 Claims, 18 Drawing Sheets

(56) References Cited

U.S. PATENT DOCUMENTS

| | | | | |
|---|---|---|---|---|
| 2016/0112901 A1* | 4/2016 | Liu | ................... | H04W 12/0013 |
| | | | | 370/310 |
| 2017/0366477 A1* | 12/2017 | Browne | .............. | H04L 49/3063 |
| 2020/0028709 A1* | 1/2020 | Kim | ........................ | H04L 47/32 |

* cited by examiner

PACKET FORMAT

TRACKING STORAGE ENTRY

TRACKING STORAGE ENTRY IN ALTERNATIVE IMPLEMENTATION

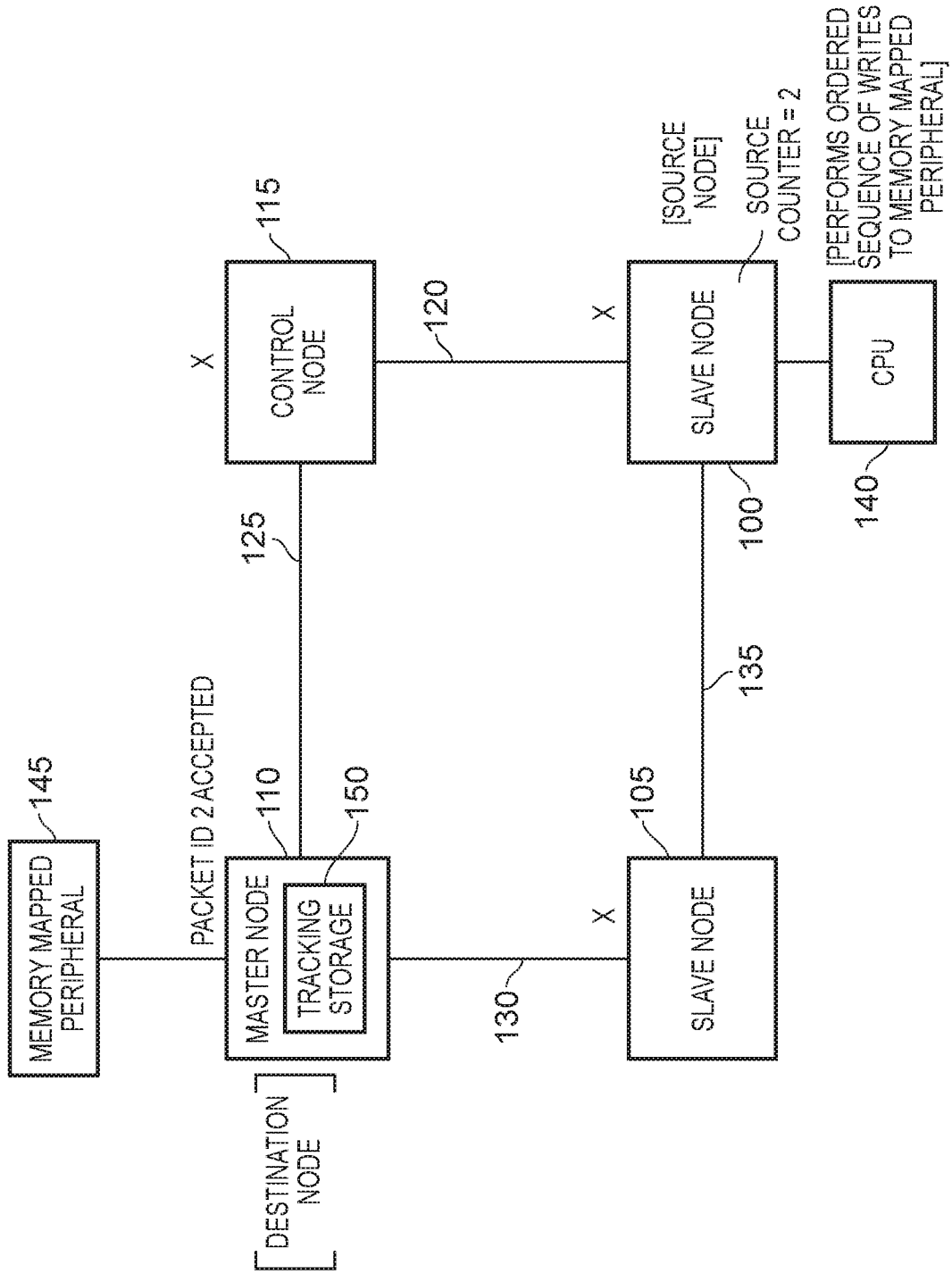

(TWO CYCLES AFTER FIG. 8G)

INTERCONNECT AND METHOD OF OPERATION OF SUCH AN INTERCONNECT

BACKGROUND

The present technique relates to an interconnect, and to a method of operation of such an interconnect.

An interconnect may be formed from a plurality of nodes, and a routing network via which information is routed between those nodes. One way in which the routing network may be formed is as a ring network, where each node is connected to the ring, and information is propagated around the ring. An interconnect incorporating such a ring network is often referred to as a ring interconnect.

The information routed around the ring network may take the form of packets of information, where each packet is added on to the ring network by a source node, and is removed from the ring network by a destination node. If the destination node is unable to accept the packet at the time it is presented to the destination node by the ring network, then that packet continues to be propagated around the ring, and after a respin period that packet will have traversed the entire ring and be re-presented back to the destination node, at which point the destination node can accept that packet if it is able to do so.

Hence, in a ring network each of the packets continues to move around the ring, and will be accepted by the destination node for that packet when that packet reaches the destination node within the ring network, and the destination node is able to accept it.

The packets may relate to individual transactions, or may relate to separate transfers within an individual transaction. In some situations, there is an ordering constraint associated with a plurality of packets, in that those packets must be received in a particular order by the destination node. Such a plurality of packets will be referred to herein as an ordered sequence of packets. In such instances, the source node could be arranged not to issue on to the ring network a next packet in the ordered sequence until it is known that the preceding packet in the sequence has been received by the destination node. However, such an approach can significantly impact performance, and accordingly it would be desirable to provide an improved mechanism for the handling of an ordered sequence of packets within a ring interconnect.

SUMMARY

In a first example configuration, there is provided an interconnect comprising: a plurality of nodes; a ring network to which each of the nodes is connected to allow packets to be transmitted between nodes; for an ordered sequence of packets one of the nodes being arranged as a source node to add each packet of the ordered sequence onto the ring network and another of the nodes being arranged as a destination node to remove each packet of the ordered sequence from the ring network; wherein: the source node is enabled to add a packet of the ordered sequence onto the ring network without waiting for a previously added packet of the ordered sequence to be removed from the ring network by the destination node; when the destination node is unable to accept a given packet of the ordered sequence that is currently being presented to the destination node by the ring network, that given packet remains on the ring network and continues to be transmitted around the ring network such that after a respin period that given packet will be presented again to the destination node; and the destination node is arranged to prevent acceptance of at least any other packets of the ordered sequence subsequently presented to the destination node by the ring network until the destination node has accepted the given packet following at least one respin period.

In another example configuration, there is provided a method of operating an interconnect that has a plurality of nodes, and a ring network to which each of the nodes is connected to allow packets to be transmitted between nodes, the method comprising: for an ordered sequence of packets, arranging one of the nodes as a source node to add each packet of the ordered sequence onto the ring network and another of the nodes as a destination node to remove each packet of the ordered sequence from the ring network; enabling the source node to add a packet of the ordered sequence onto the ring network without waiting for a previously added packet of the ordered sequence to be removed from the ring network by the destination node; when the destination node is unable to accept a given packet of the ordered sequence that is currently being presented to the destination node by the ring network, retaining that given packet on the ring network and continuing to transmit that given packet around the ring network such that after a respin period that given packet will be presented again to the destination node; and preventing the destination node from accepting at least any other packets of the ordered sequence subsequently presented to the destination node by the ring network until the destination node has accepted the given packet following at least one respin period.

In a still further example configuration, there is provided an interconnect comprising: a plurality of node means; a ring network means to which each of the node means is connected to allow packets to be transmitted between the node means; for an ordered sequence of packets, one of the node means being arranged as a source node means for adding each packet of the ordered sequence onto the ring network means and another of the node means being arranged as a destination node means for removing each packet of the ordered sequence from the ring network means; wherein: the source node means is enabled for adding a packet of the ordered sequence onto the ring network means without waiting for a previously added packet of the ordered sequence to be removed from the ring network means by the destination node means; when the destination node means is unable to accept a given packet of the ordered sequence that is currently being presented to the destination node means by the ring network means, that given packet remains on the ring network and continues to be transmitted around the ring network means such that after a respin period that given packet will be presented again to the destination node means; and the destination node means for preventing acceptance of at least any other packets of the ordered sequence subsequently presented to the destination node means by the ring network means until the destination node means has accepted the given packet following at least one respin period.

BRIEF DESCRIPTION OF THE DRAWINGS

The present technique will be described further, by way of illustration only, with reference to examples thereof as illustrated in the accompanying drawings, in which:

FIGS. 8A to 8I schematically illustrate a sequence of cycles within the ring network used to propagate an ordered sequence of packets in accordance with the techniques described herein.

DESCRIPTION OF EXAMPLES

Figure 1A:
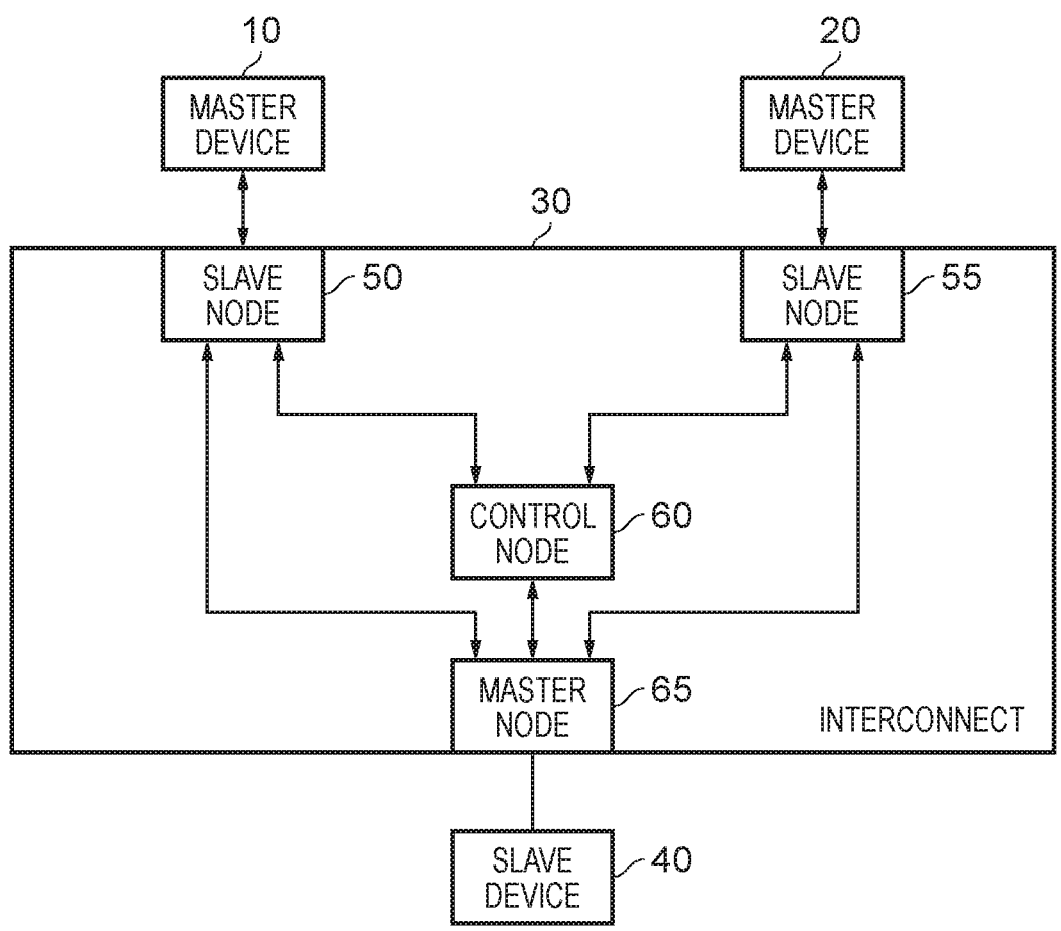
FIG. 1A is a diagram schematically illustrating an interconnect.

In accordance with the techniques described herein, an interconnect has a plurality of nodes, and a ring network to which each of the nodes is connected to allow packets to be transmitted between nodes. For an ordered sequence of packets, one of the nodes is arranged as a source node to add each packet of the ordered sequence on to the ring network, and another of the nodes is arranged as a destination node to remove each packet of the ordered sequence from the ring network.

By default, the source node is enabled to add a packet of the ordered sequence on to the ring network without waiting for a previously added packet of the ordered sequence to be removed from the ring network by the destination node. As a result, this can significantly improve performance, but requires a mechanism to ensure that the destination node receives the packets of the ordered sequence in the correct order. In particular, when the destination node is unable to accept a given packet of the ordered sequence that is currently being presented to the destination node by the ring network, that given packet remains on the ring network and continues to be transmitted around the ring network such that after a respin period that given packet will be presented again to the destination node. In order to ensure that the ordering constraints of the ordered sequence are met, in such an instance where the destination node has rejected the given packet, that destination node is arranged to prevent acceptance of at least any other packets of the ordered sequence subsequently presented to the destination node by the ring network until the destination node has accepted the given packet following at least one respin period. By such an approach, if during the respin period the destination node is presented with another packet of the ordered sequence, and is otherwise in a position to accept that packet, it will not accept that packet at that point in time, and instead will ensure that the next packet of the ordered sequence that it does accept is the given packet.

By such an approach, it is possible to increase the performance of the interconnect when handling ordered sequences of packets, whilst ensuring that the ordering constraint associated with such ordered sequences is met.

Whilst in one example implementation, the destination node may only be prevented from accepting any other packets of the ordered sequence until the given packet that was initially rejected has subsequently been accepted by the destination node, in an alternative implementation the destination node may be arranged to prevent acceptance of any packets whose destination is that destination node, until after the destination node has accepted the given packet following the at least one respin period. This provides an efficient implementation, by reducing the analysis that needs to be performed in relation to packets presented to the destination node following the rejection of the given packet. For instance, in one example implementation where a counter is used to monitor the elapse of the respin period, the destination node can merely reject any packet presented to it during the respin period without further analysis.

There are a number of ways in which the destination node can keep track of a given packet that it has rejected, so that it can determine whether to accept that given packet in due course after the respin period. In one example implementation the destination node has tracking storage to store information to enable the given packet to be identified when it is re-presented to the destination node after the respin period.

The tracking storage can take a variety of forms, but in one example implementation the information stored in the tracking storage is a packet identifier for the given packet. In particular, in one implementation each live packet present on the ring network will have a unique packet identifier, and hence this packet identifier can be used to identify when the rejected given packet is re-presented to the destination node.

However, in an alternative implementation, there may be no requirement to maintain information about the packet identifier itself, and instead knowledge of the ring network can be used to determine when the given packet will be re-presented to the destination node. In particular, in one example, the ring network is arranged so that a packet that is not accepted by any of the nodes will make a full traversal of the ring network in N cycles, and the information stored in the tracking storage is a count value that is used to track N cycles following the given packet not being accepted by the destination node.

In one example implementation, information in the packet can be used to distinguish between a packet that is part of an ordered sequence and a packet that is not. For example, in one implementation each packet has a flag to identify whether that packet is a packet of the ordered sequence, and the destination node is arranged, until the destination node has accepted the given packet following the at least one respin period, to prevent acceptance of at least any other packet presented to the destination node by the ring network whose flag indicates that that packet is one of the packets of the ordered sequence. Hence, the presence of the flag within a packet can be used to determine whether that packet needs to be tracked or not if it is rejected by the destination node, and can also be used if desired to determine whether any other packets, presented to the destination node between the time the given packet is rejected and the given packet is subsequently accepted after at least one respin period, can be accepted by the destination node.

In one implementation it may be the case that only a single ordered sequence of packets can be presented on to the ring network at any point in time, and in such instances the tracking storage may only require a single entry which can then be activated once a given packet of the ordered sequence is rejected, and hence the at least one respin period needs to be tracked in order to ensure that no other packets of the ordered sequence are accepted by the destination node until the given packet has been accepted. However, in an alternative implementation the ring network may be enabled to transmit packets of a plurality of ordered sequences at any point in time, and the information stored in the tracking storage may include a sequence identifier to identify the ordered sequence to which the given packet belongs. Hence, in such instances the tracking storage may have multiple entries, to enable more than one ordered sequence to be tracked at the same time, in particular where packets within multiple ordered sequences are rejected by the destination node.

There are a number of ways in which the sequence identifier information may be provided within the tracking storage. In one example implementation, each packet has a sequence identifier field to identify whether that packet is a packet of an ordered sequence, and in the event that that packet is a packet of an ordered sequence to identify which ordered sequence that packet belongs to. Hence, that sequence identifier field information provided within the packet can be used directly to populate the sequence identifier information within the tracking storage.

However, in an alternative implementation each source node may be restricted to only process one ordered sequence at any point in time. In such instances, the sequence identifier may comprise a source identifier determined from a source identifier field of the given packet. In particular, since any particular source node can only process one ordered sequence at a time, the source identifier information is sufficient to identify the ordered sequence. Hence, in such an implementation, the earlier discussed flag provided within each packet can be used by the destination node to determine whether a packet it intends to reject is part of an ordered sequence, and in the event that packet is rejected the source identifier information can be added into the tracking storage, along with the information used to track the packet itself (for example the earlier-discussed packet identifier or the count value used to track the elapse of the respin period).

In one example implementation, the source node is arranged to monitor each packet routed via the source node by the ring network, and is arranged, responsive to detecting any packet of the ordered sequence being routed via the source node by the ring network, to disable the adding of at least any further packets of the ordered sequence to the ring network for at least one respin cycle.

Hence, once the source node has noticed that the destination node has rejected a packet of an ordered sequence for which it is the source node, then the source node can be arranged to disable the adding of any further packets of the ordered sequence to the ring network for at least one respin cycle.

It should be noted that in the intervening period between the destination node rejecting the given packet, and the source node subsequently observing that the given packet has been rejected, the source node may have added some additional packets of the ordered sequence on to the ring network, but the earlier discussed functionality of the destination node will ensure that those other packets are not accepted before the given packet is accepted. By arranging the source node to itself disable adding additional packets of the ordered sequence on to the ring network once it has observed one of its earlier packets of the ordered sequence being respun, this avoids the possibility of newer packets of the ordered sequence being interleaved between older packets of the ordered sequence already on the ring network, and hence prevents the possibility of such a scenario causing the ordering constraint to be violated. Further this avoids congesting the ring network with further packets of the ordered sequence, and can thereby increase the efficiency of the utilisation of the available resources of the ring network.

In one example arrangement, when, following elapse of the at least one respin cycle after a most recently detected packet of the ordered sequence had caused the source node to disable the adding of any further packets of the ordered sequence to the ring network, the source node observes that that most recently detected packet is no longer routed via the source node, the source node is re-enabled to add further packets of the ordered sequence to the ring network. Hence, once the source node has observed one of its packets of the ordered sequence having been rejected, it can monitor the elapse of a respin cycle following that observation, in order to determine whether that packet has or has not been accepted by the destination node in the current respin cycle. This can be used to determine when to re-enable the source node to add further packets of the ordered sequence to the ring network.

There are a number of ways in which the source node can be arranged to track progress of rejected packets that it has observed being respun around the ring network. In one example arrangement, the ring network is arranged so that a packet that is not accepted by any of the nodes will make a full traversal of the ring network in N cycles, and the source node maintains a counter which is initialised each time a packet of the ordered sequence is detected as being routed via the source node by the ring network. The source node is then arranged when a current value of the counter indicates elapse of N cycles, to re-enable the adding of further packets of the ordered sequence to the ring network when it is determined that a packet of the ordered sequence is not currently being presented to the source node.

Hence, the counter can keep being reinitialised each time the source node observes one of the packets of the ordered sequence being respun, but once the counter indicates elapse of N cycles, thereby indicating the elapse of a respin cycle since the counter was last initialised, it can then re-enable the adding of further packets if at that time no packet of the ordered sequence is presented to the source node.

There are a number of ways in which the packets can be identified by the source node. In one example, each packet has a source identifier field to identify the source node that added the packet to the ring network, and the source node is arranged to monitor the source identifier field of each packet routed via the source node by the ring network in order to detect when any packet of the ordered sequence is routed via the source node by the ring network.

Further, in one implementation each packet has a flag to identify whether that packet is a packet of the ordered sequence, and the source node is arranged to monitor the source identifier field and the flag of each packet routed via the source node by the ring network in order to detect when any packet of the ordered sequence is routed via the source node by the ring network.

Whilst in one implementation, when the source node detects any packet of the ordered sequence being routed via the source node by the ring network, it may disable the adding of any further packets of the ordered sequence, in an alternative implementation it may at that point disable the adding of any further packets (whether those packets are for the ordered sequence or not) to the ring network for the at least one respin cycle. This can simplify the operation of the source node.

Particular examples will now be described with reference to the Figures.

FIG. 1A is a block diagram illustrating a system incorporating an interconnect. A number of master devices 10, 20 may be connected to associated slave nodes 50, 55 within the interconnect. Similarly, one or more slave devices 40 may be coupled to the interconnect via an associated master node 65. Whilst for simplicity of illustration the example of FIG. 1A merely shows two master devices and one slave device connected to the interconnect, it will be appreciated that the number of master devices and slave devices connected to any particular interconnect will vary dependent on implementation, and in some implementations there could be significantly more master devices and slave devices connected to the interconnect.

In addition to the slave nodes and master nodes shown in FIG. 1A, that are used to couple master and slave devices to the interconnect, one or more other nodes may be present within the interconnect. For example, the interconnect 30 can include one more control nodes 60. Each control node can be used to receive at least certain types of requests issued by the slave nodes in response to requests received by their connected master devices, and to perform a predetermined operation in order to process such requests. For example, the control node 60 may be a cache structure used to cache data for access by the master devices, and/or cache coherency circuitry used to perform cache coherency operations in order to ensure that any cached copies of the data held locally by the master devices are kept coherent. In some instances, the control node may need to propagate on requests via a master node 65 to a slave device 40 for processing.

As shown in FIG. 1A, packets of information transmitted within the interconnect 30 may need to be passed directly between slave nodes and master nodes, or between a slave node and a control node, or between a control node and a master node. The routing network provided by the interconnect 30 to allow packets to be communicated between the various nodes can take a variety of forms, but in one implementation a ring network is used, as schematically illustrated in FIG. 1B.

Figure 1B:
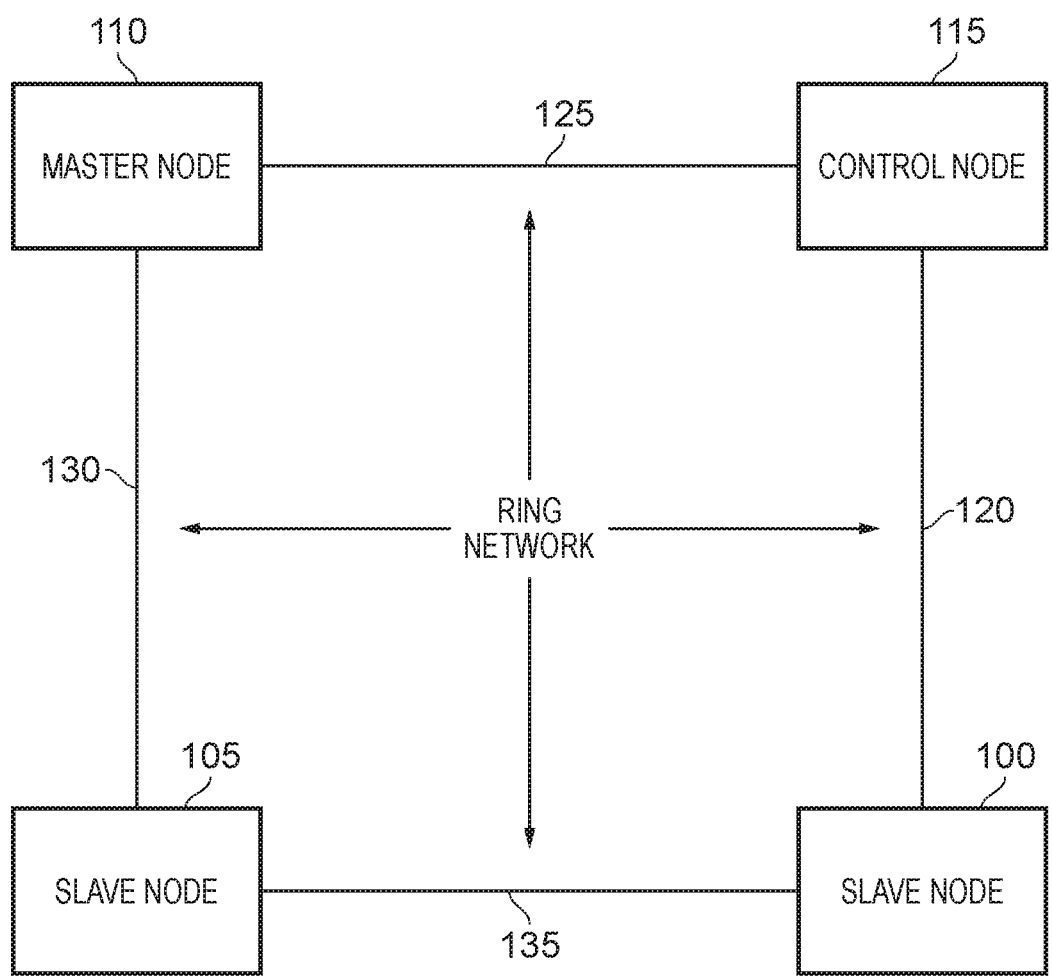
FIG. 1B is a diagram schematically illustrating how a ring network may be used to implement the interconnect of FIG. 1A in accordance with one example arrangement.

As shown in FIG. 1B, the ring network is formed of paths 120, 125, 130, 135, and the various slave nodes, master nodes and control nodes are provided at the intersections between the paths forming the ring. In this example, to be consistent with the nodes shown in FIG. 1A, two slave nodes 100, 105, one control node 115 and one master node 110 are shown. However, it will be appreciated that there may be a number of further nodes provided within an interconnect, and in that event the number of connecting paths used to form the ring would increase. The ring may be formed as a unidirectional ring, where all packets pass in the same direction, i.e. clockwise or anticlockwise, or alternatively may be formed as a bidirectional ring where packets can pass in either direction, i.e. clockwise and anticlockwise. The various communication paths 120, 125, 130, 135 shown in FIG. 1B may actually be used to provide multiple channels of communication, and for each channel there may be in some instances a single direction of transmission around the ring. Hence, for example requests may be propagated clockwise within a request communication channel, whilst responses may be propagated anticlockwise within one or more response channels.

When any particular packet needs to be transmitted around the ring network, one node will be a source node used to add that packet onto the ring network, and another node will be a destination node that then removes that packet from the ring network. If the destination node is unable to accept the packet at the time it is presented to the destination node, then as discussed earlier the packet is respun around the ring, such that after a respin period that packet will be presented again to the destination node, at which point the destination node can accept the packet if it is able to do so.

However, in some instances, an ordered sequence of packets may need to be transmitted around the ring. In such instances, the order in which the packets in the ordered sequence are removed by the destination node is required to follow a predetermined order. There are a variety of reasons why an ordered sequence of packets may need to be transmitted via the ring network. As one example, a burst transaction may define a plurality of transfers (also referred to herein as beats) which need to take place between the source node and the destination node, and may require that those transfers are received by the destination node in a predetermined order. As another example, the source node may be seeking to perform, via a series of transactions, write operations to a particular memory mapped peripheral device connected to a master node, where each transaction specifies a single write packet. The memory mapped peripheral could take a variety of forms, one example being a network interface card. When performing write operations to such a memory mapped peripheral, the order in which the write operations are performed is significant. In such instances, there will again be a requirement for an ordered sequence of packets to be transmitted between the source node and the destination node.

Figure 2:
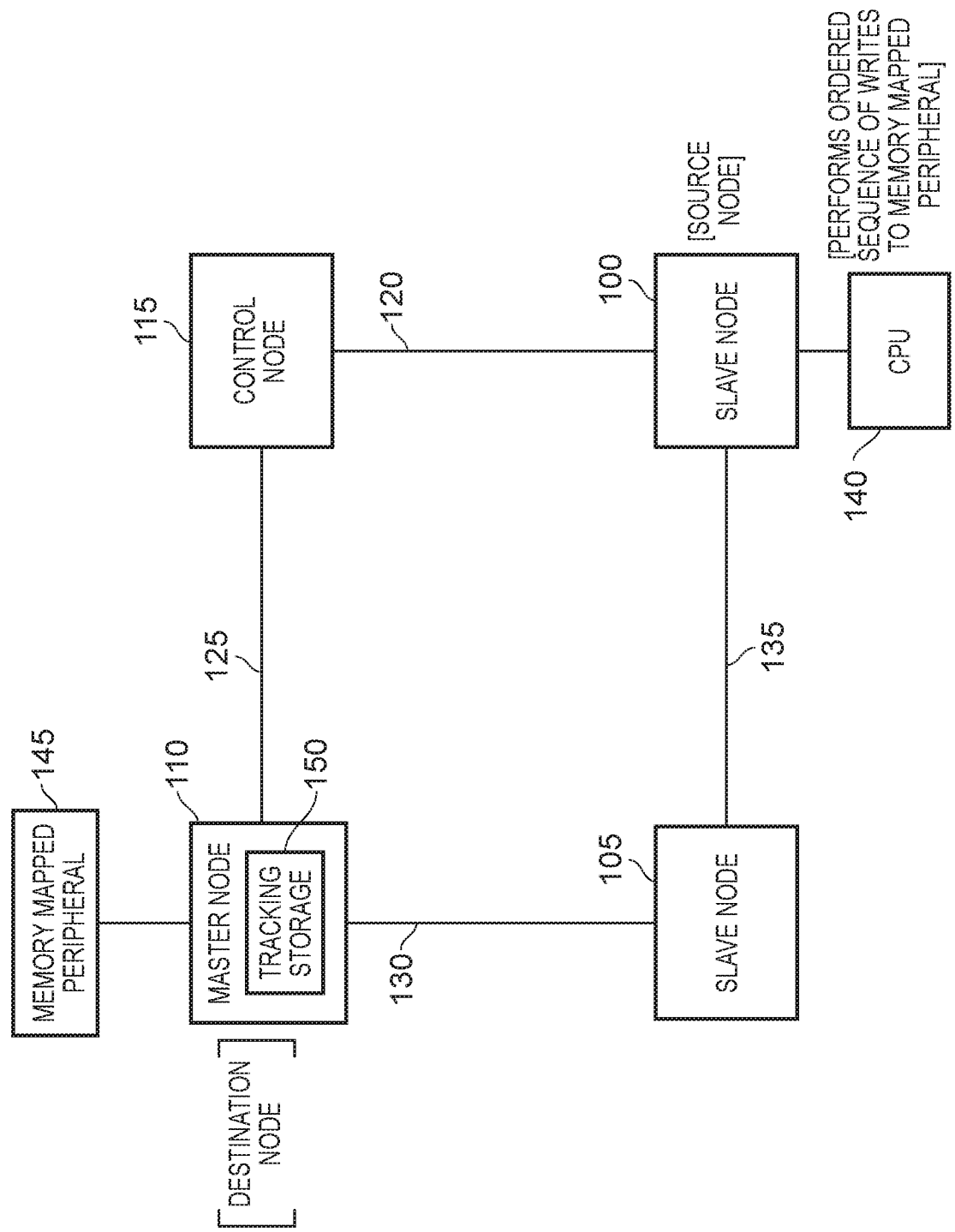
FIG. 2 schematically illustrates a particular form of the ring network of FIG. 1B in accordance with one example arrangement.

The above latter example of a source node performing an ordered sequence of write operations to a memory mapped peripheral is illustrated schematically in FIG. 2. In particular, it is assumed that a central processing unit (CPU) 140 is connected to the slave node 100, and performs an ordered sequence of write operations to a memory mapped peripheral 145 coupled to the master node 110 by issuing a series of packets onto the ring network for receipt by the master node 110, in this instance the master node 110 being the destination node. As each packet is received by the master node, then the master node communicates with the memory mapped peripheral 145 in order to cause the corresponding write operation to be performed.

To ensure the ordering constraint associated with the ordered sequence of packets is met, the master node 110 is provided with tracking storage 150 that can be used to keep track of a given packet within the ordered sequence in a situation where that given packet is rejected by the master node. This may for example occur because at the time the ring network 120, 125, 130, 135 presents the packet to the master node, the master node is not in a position to accept that packet, for example because its buffer is full, and accordingly at that time it has to reject the presented packet.

At that point, the master node can populate an entry within the tracking storage 150 to enable it to track that rejected packet, so that following the respin period (i.e. following the time taken for that packet to do a full transfer around the ring network), the master node can then detect that the given packet is being presented again to the master node, and can determine at that point whether to accept the packet, or to reject it for another respin period.

To ensure the ordering constraints of the sequence of packets is maintained, once the given packet has been rejected, and an entry has been populated within the tracking storage 150, the master node is arranged to reject at least any other further packets of the ordered sequence that are presented to it, until after it has accepted the given packet following at least one respin period. In some implementations, the master node may be arranged to reject any packets presented to it during the respin period, prior to the given packet being accepted.

Figure 3A:
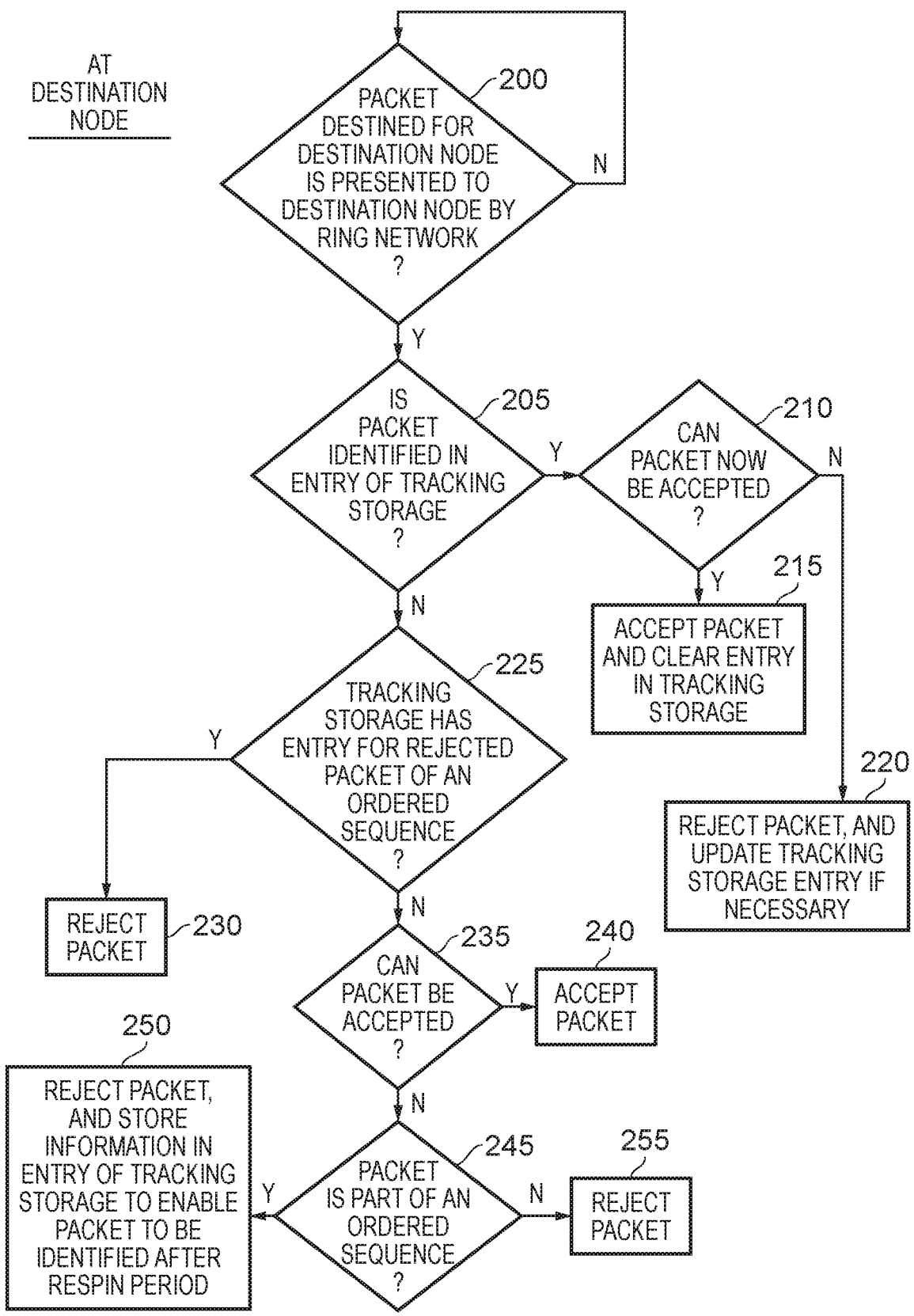
FIG. 3A is a flow diagram illustrating the operation of the destination node shown in FIG. 2, in accordance with one example arrangement.

FIG. 3A is a flow diagram illustrating the operation of the destination node 110 shown in FIG. 2, in accordance with one implementation. At step 200, it is determined whether a packet destined for the destination node is presented to the destination node by the ring network. When such a packet is presented to the destination node, then the process proceeds to step 205, where it is determined whether the packet is identified in an entry of the tracking storage 150. If so, this means that that given packet has previously been rejected by the destination node, and accordingly is being re-presented to the destination node following at least one respin period.

In the event that the packet is identified in an entry of the tracking storage, the process proceeds to step 210 where it is determined whether that packet can now be accepted. If so, the process proceeds to step 215 where the packet is accepted, and the relevant entry in the tracking storage 150 is cleared. However, if the packet cannot be accepted, then the process proceeds to step 220 where the packet is rejected, and the tracking storage entry is updated if necessary. Examples of different formats that can be used for the tracking storage entries will be discussed later with reference to FIGS. 5A and 5B, but in one implementation a counter mechanism is used to track the rejected packet, and in that instance the counter can be reset at step 220 in order to enable the tracking of a further respin period.

Returning to step 205, if it is determined that the packet is not identified in an entry of the tracking storage, then it is determined at step 225 whether the tracking storage has an entry for a rejected packet of an ordered sequence. If it does, then in the implementation shown in FIG. 3A the process proceeds to step 230 where the packet is rejected. Hence, in this implementation, whilst there is a live entry within the tracking storage, all subsequent packets are rejected until that entry is cleared.

However, if at step 225 it is determined that the tracking storage does not have an entry for a rejected packet of an ordered sequence, the process proceeds to step 235 where it is determined whether the destination node is currently able to accept the packet. If it is, then the process proceeds to step 240 where the packet is accepted. However, if it is not, then the process proceeds to step 245 where it is determined whether the currently presented packet is part of an ordered sequence. If it is not, then the packet can merely be rejected at step 255 and no further steps are required to be taken by the destination node.

However, if at step 245 it is determined that the packet is part of an ordered sequence, then the process proceeds to step 250 where, in addition to rejecting the packet, information is stored in an entry of the tracking storage 150 to enable the packet to be identified later after the respin period.

Figure 3B:
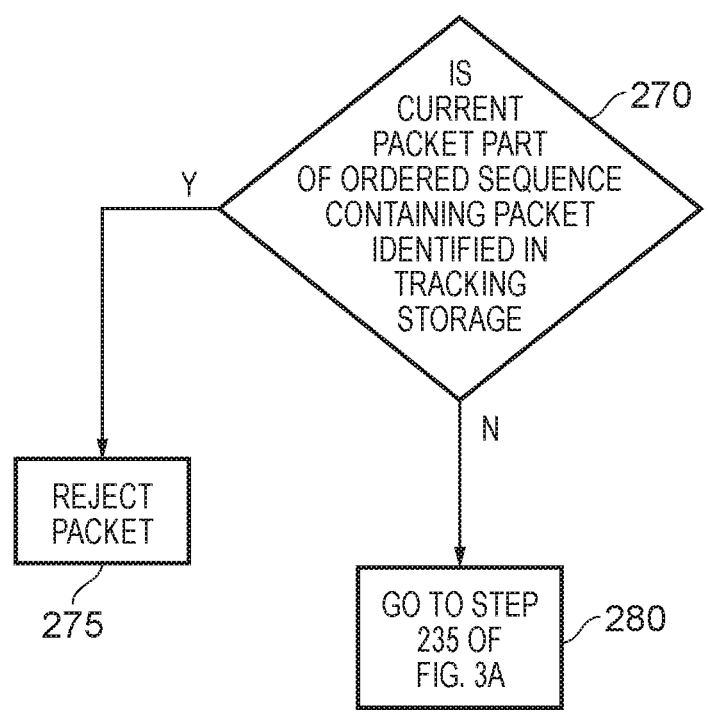
FIG. 3B illustrates additional optional steps that may be implemented within the process of FIG. 3A in accordance with one example arrangement.

FIG. 3B is a flow diagram illustrating an alternative to step 230 of FIG. 3A, in an implementation where not all packets are automatically rejected in a situation where the tracking storage has an active entry. In particular, if at step 225 it is determined that the tracking storage has an entry for a rejected packet of an ordered sequence, the process proceeds to step 270 where it is determined whether the currently presented packet is part of the ordered sequence that contains the packet identified in the tracking storage. If it is, then the process proceeds to step 275 where the packet is rejected, but otherwise, as indicated by step 280, the process proceeds to step 235 of FIG. 3A, with the remainder of the process illustrated in FIG. 3A then being performed.

Figure 4:
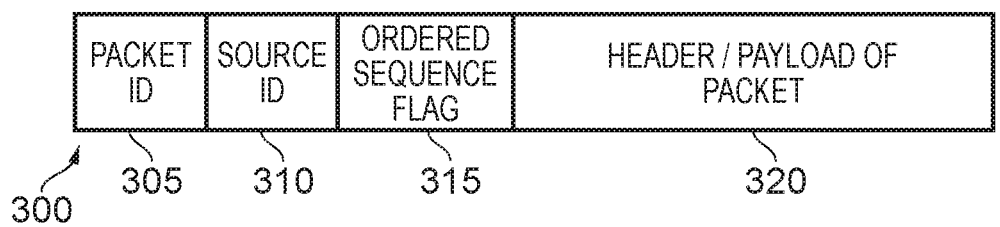
FIG. 4 is a diagram schematically illustrating a packet format used in one example implementation.

FIG. 4 is a diagram schematically illustrating a packet format that may be used for packets transmitted within the ring network in one example implementation. Each packet 300 may include a packet ID field 305 used to identify the packet. In one implementation, all of the live packets that are active within the ring network will have a unique identifier, and this can be captured within the field 305.

In the implementation shown in FIG. 4, a source identifier field 310 is also provided, to identify the node within the interconnect that has acted as the source node for this packet, i.e. the node that has issued that packet on to the ring network.

In addition, a field 315 can be provided to store an ordered sequence flag. In one implementation, this may be a single bit field, which can be set if the packet is part of an ordered sequence, and can otherwise be cleared.

As also shown in FIG. 4, the header and payload information of the packet 320 can also be provided within the packet format 300. The information maintained within the field 320 will be dependent on the type of packet being transmitted.

Figure 5A:
FIGS. 5A and 5B illustrate two example formats that may be used within a tracking storage entry maintained by the destination node in accordance with one example arrangement.
Figure 5B:
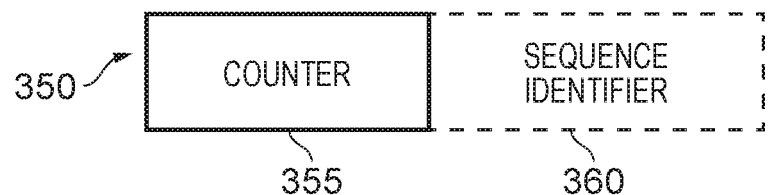

The information held within an entry of the tracking storage 150 may vary dependent on implementation, and two examples are illustrated in FIGS. 5A and 5B. In the example illustrated in FIG. 5A, the tracking entry 330 includes a packet ID field 335 used to store the packet ID of the packet that has been rejected. As will be apparent from the earlier discussion of FIG. 3A, this entry will be populated when a packet that is rejected by the master node is a packet of an ordered sequence, and there is not already an active entry in the tracking storage associated with that ordered sequence, i.e. there is not already a previous packet of the same ordered sequence that has also been rejected and not yet accepted.

As an alternative to using the packet ID as a way of determining in due course when the packet is re-presented to the destination node following the respin period, a counter mechanism can instead be used, as illustrated in FIG. 5B. In particular, in one implementation packets continue to move around the ring network, such that each packet traverses one of the connection paths 120, 125, 130, 135 during each operating cycle of the ring network. Hence, the number of cycles that it will take for a rejected packet to be re-presented to the destination node is determined by the number of connecting paths within the ring network, and a counter value can be held within the field 355 of the entry 350 in order to track the elapse of the required number of cycles. In one example arrangement, the counter could be set to an initial value, and then decremented during each cycle, so that when the counter reaches zero, the destination node knows that the currently presented packet is the packet that it previously rejected. It will be appreciated however that there is no need for the counter to be a decrementing counter, and in an alternative implementation an incrementing counter could be used, such that when the counter reaches a predefined value, this indicates that the packet currently being presented to the destination node is the packet that was previously rejected.

In one implementation the ring network may be constrained so that only a single ordered sequence of packets can be active within the ring at any point in time. In such instances, only a single entry will be needed within the tracking storage 150, and no additional information will be required to identify the ordered sequence. However, as shown by the dotted boxes 340, 360 in FIGS. 5A and 5B, in implementations where more than one ordered sequence may be in the process of being transmitted at the same time within the ring, a sequence identifier field can be added to the tracking storage entry to identify the particular sequence to which the rejected packet relates.

In some implementations, the packet format may be supplemented in order to include a sequence identifier, and in that instance the sequence identifier information can be replicated directly within the fields 340, 360 at the time the relevant packet is rejected. However, in one implementation, each source node may be restricted to only process one ordered sequence at any point in time, and hence the source identifier information within the field 310 of the packet 300 can be used to populate the sequence identifier information within the fields 340, 360 of the tracking storage entry at the time the packet is rejected. This sequence identifier information can then be referenced by the destination node when determining whether to reject currently presented packets or not. For example, if the approach of FIG. 3B is used, then the sequence identifier information can be referred to at step 270 when determining whether the currently presented packet is part of an ordered sequence that contains a packet already identified in an entry of the tracking storage.

In accordance with the techniques described herein, the source node is arranged, by default, so that it is able to add a packet of an ordered sequence on to the ring network without waiting for a previously added packet of the ordered sequence to be removed from the ring network by the destination node. Due to the earlier discussed examples of how the destination node operates, and in particular how it operates after having rejected a packet of an ordered sequence in order to ensure that the ordering constraints of the ordered sequence are met, the adding of the additional packets on to the ring network by the source node can be accommodated whilst ensuring that the ordering constraints are met. However, an issue could arise once the source node has seen a rejected packet of an ordered sequence being respun around the routing network if it continued to freely add further packets on to the routing network thereafter, since those additionally added packets could be interleaved with previous packets of the ordered sequence that are also being respun around the network.

One way to address this issue, whilst still enabling the source node to continue to add packets from the ordered sequence even after having seeing a rejected packet being respun past the source node, would be to provide ordering information within each packet, so that the destination node can determine whether a particular packet of the ordered sequence being presented to it is the next packet that needs accepting. However, in an alternative implementation, in order to avoid the need to add ordering information into each packet of an ordered sequence, the source node is arranged to selectively disable the adding of additional packets of the ordered sequence on to the ring network once it has seen a rejected packet of the ordered sequence being respun around the routing network. The manner in which the source node operates in such an implementation will be discussed by way of example with reference to FIGS. 6A, 6B and 7.

Figure 6A:
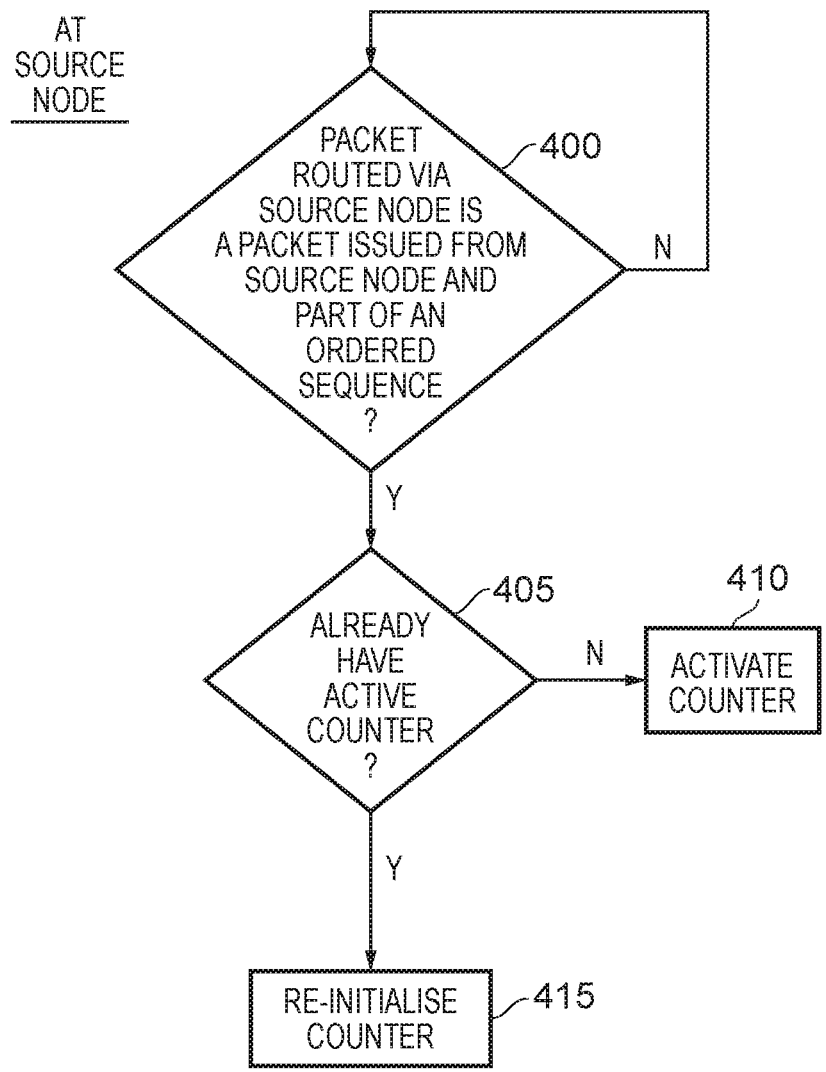
FIGS. 6A and 6B illustrate the operation of the source node shown in FIG. 2 in accordance with one example arrangement.

As shown in FIG. 6A, at step 400 the source node (for example the slave node 100 shown in FIG. 2) monitors the packets that are routed past it through the ring network, in order to detect when a packet being routed past it is actually a packet that it has previously issued, and that is part of an ordered sequence. Such a scenario indicates a situation where the destination node (e.g. the destination node 110 in the example of FIG. 2) has rejected that packet, and accordingly the packet is being respun around the routing network. Prior to this point, any additionally added packets by the source node 100 will naturally be in order, following behind the lead packet that has been rejected by the destination node, and accordingly that ordering amongst those packets will be maintained until those packets are accepted by the destination node 110. In particular, in accordance with the mechanism discussed earlier, the first packet that the master node will accept will be the one that it has rejected and maintained a tracking storage entry for, and thereafter each subsequently presented packet will be in order, and can be accepted or rejected, using the earlier described mechanism.

However, if following the lead rejected packet being passed by the source node 100, the source node were then to insert an additional packet of the ordered sequence onto the routing network, that packet could be interleaved between that lead rejected packet and the next packet in the sequence, and could cause the ordering constraint to be violated when the packets are subsequently accepted by the destination node 110.

Hence, in accordance with the approach illustrated in FIG. 6A, the slave node 100 can activate a counter that can be used to temporarily disable the adding of additional packets of the ordered sequence on to the ring. In particular, when at step 400 a packet is observed being routed past the source node that is one of the source node's earlier issued packets and is part of an ordered sequence (the source node being able to detect this with reference to the source ID field 310 and ordered sequence flag 315 of the packet as discussed earlier with reference to FIG. 4), then at step 405 it is determined whether there is already an active counter being maintained by the source node. If not, then the counter is activated at step 410, whereas otherwise the counter is re-initialised at step 415.

In one example implementation, the counter operates in much the same manner as discussed earlier for the counter-based example of the tracking storage entry discussed with reference to FIG. 5B. Hence, the counter takes into account the size of the ring network, and hence the number of cycles of operation of the ring network that will be required to implement a respin period.

Figure 6B:
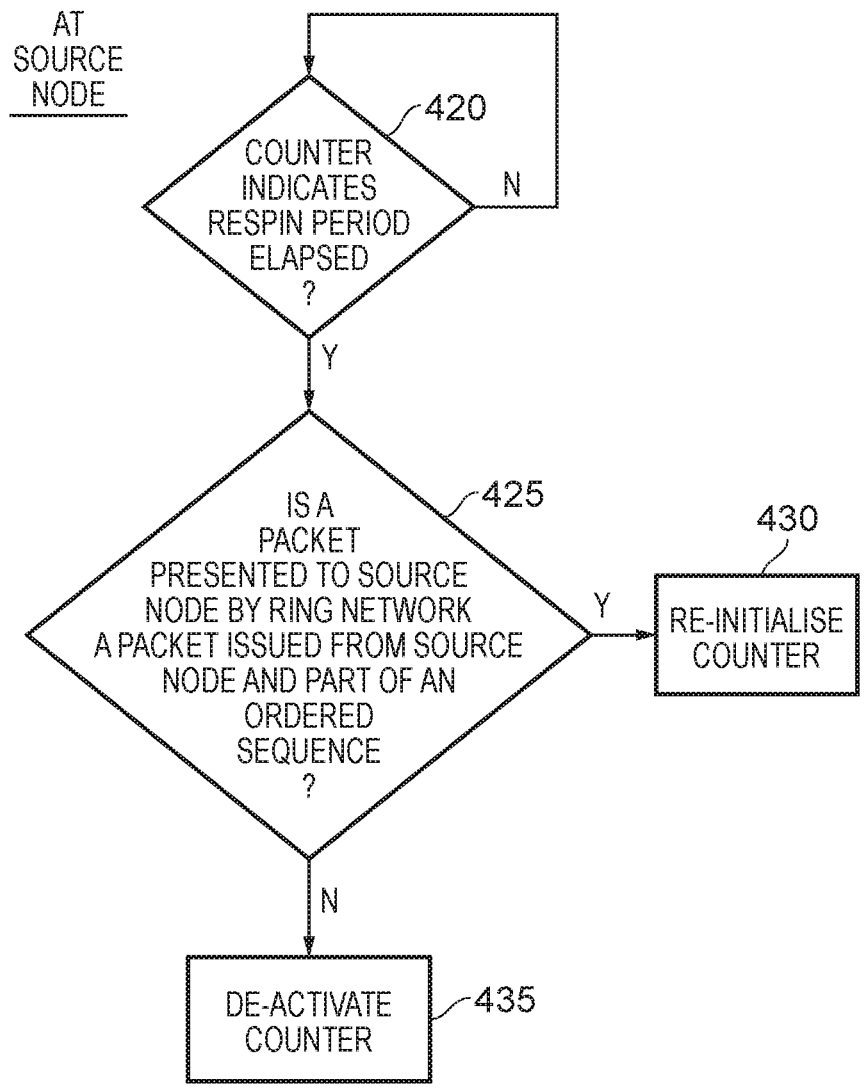

FIG. 6B indicates a mechanism that can be employed to determine when to deactivate the counter. In particular, at step 420, it is determined whether the current counter value indicates that the respin period has elapsed. As will be apparent from the earlier-discussed FIG. 6A, the elapsing of this respin period will occur after one respin period since the most recently observed packet of the ordered sequence is detected at step 400.

At step 425, the source node 100 then determines whether there is a packet being presented to the source node in the current cycle, and if so whether that packet is a packet that was issued by the source node and is part of the ordered sequence. If this is the case, then this indicates that the destination node has still rejected the packet, and accordingly the process proceeds to step 430 where the counter is re-initialised, to enable a next respin period to be counted. However, if it is determined at step 425 that there is no longer a packet being presented to the source node that is a packet previously issued by the source node and part of the ordered sequence, then this indicates that during the last respin cycle the destination node 110 accepted that packet, and accordingly the process proceeds to step 435 where the counter is deactivated.

Figure 7:
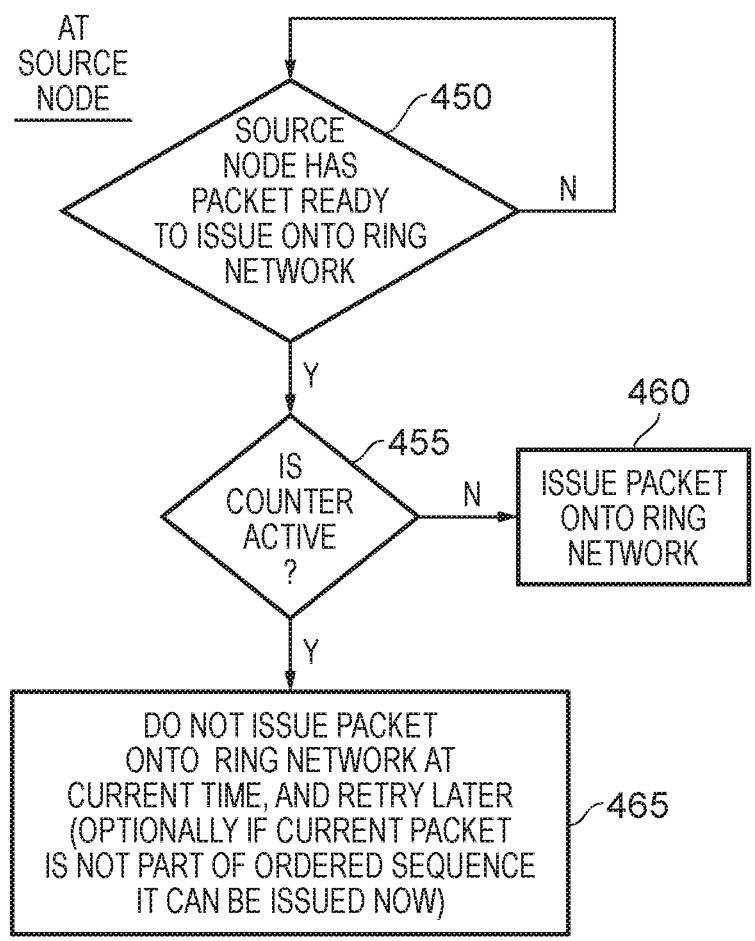
FIG. 7 is a flow diagram illustrating how the source node determines whether it is able to issue a new packet on to the ring network, in accordance with one example arrangement.

As will now be discussed with reference to FIG. 7, the source node can determine whether it is able to issue further packets on to the ring network, dependent on whether its counter is active or not. At step 450 it is determined whether the source node has a packet that is ready to issue on to the ring network. It is also assumed at this point that there is space available on the ring network to issue that packet. If this is the case, then it is determined at step 455 whether the counter is active, and if it is not the packet is issued on to the ring network at step 460.

However, if the counter is active, then at step 465 the source node does not issue the packet on to the ring network at the current time, and instead retries later. In one implementation, this will be the case irrespective of the type of packet that the source node is seeking to issue. However, if desired, at step 465 the source node 100 could decide to continue to issue the packet on to the ring network if that packet is not part of the ordered sequence.

Figure 8A:
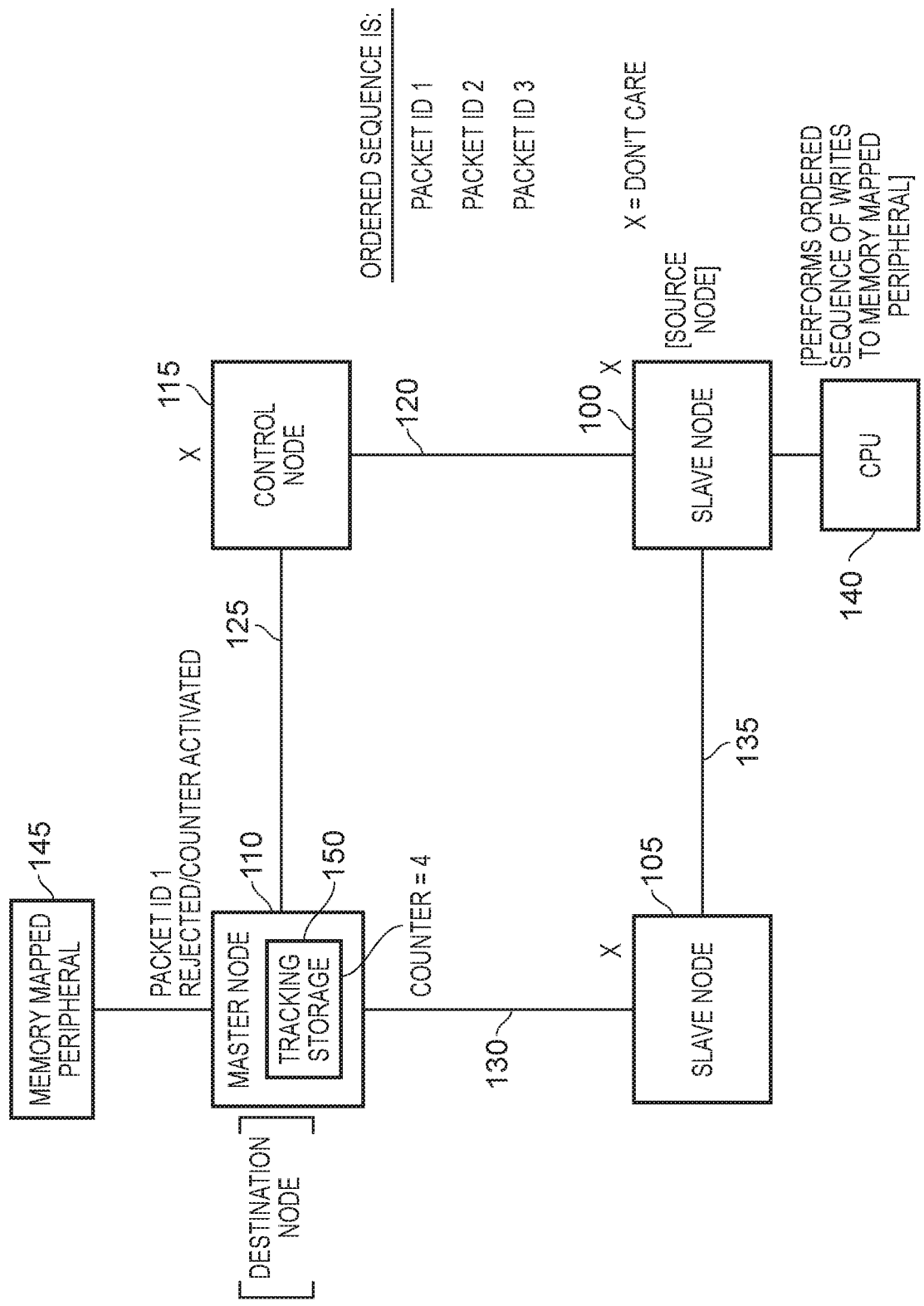

FIGS. 8A to 8I are used to schematically illustrate a sequence of cycles within the ring network, in order to show how an ordered sequence of packets can be propagated around the ring network in accordance with the techniques described herein. In FIGS. 8A to 8I, it is assumed that the ring network is constructed as discussed earlier with reference to FIG. 2. FIG. 8A illustrates the position two cycles after the source node 100 has issued a packet of an ordered sequence that is referred to in FIG. 8A as having the packet ID 1. This may or may not be the actual first packet of the ordered sequence, but it is assumed that any preceding packets in the ordered sequence have already been accepted by the destination node 110. As shown in FIG. 8A, it is assumed that packet ID 1 is rejected by the destination node, and accordingly an entry is made within the tracking storage 150. In this example, it is assumed that the tracking storage entries are as shown in FIG. 5B, and accordingly the counter is initialised in the tracking entry. In the example shown it is assumed that the counter will be a decrementing counter, and accordingly the counter is set to a value of four (four being the number of cycles required to implement a respin period for the ring network shown in FIGS. 8A to 8I). An "X" in FIGS. 8A to 8I is intended to show a "don't care" state, and accordingly it does not matter whether the associated node is being presented with an active packet or not.

Figure 8B:
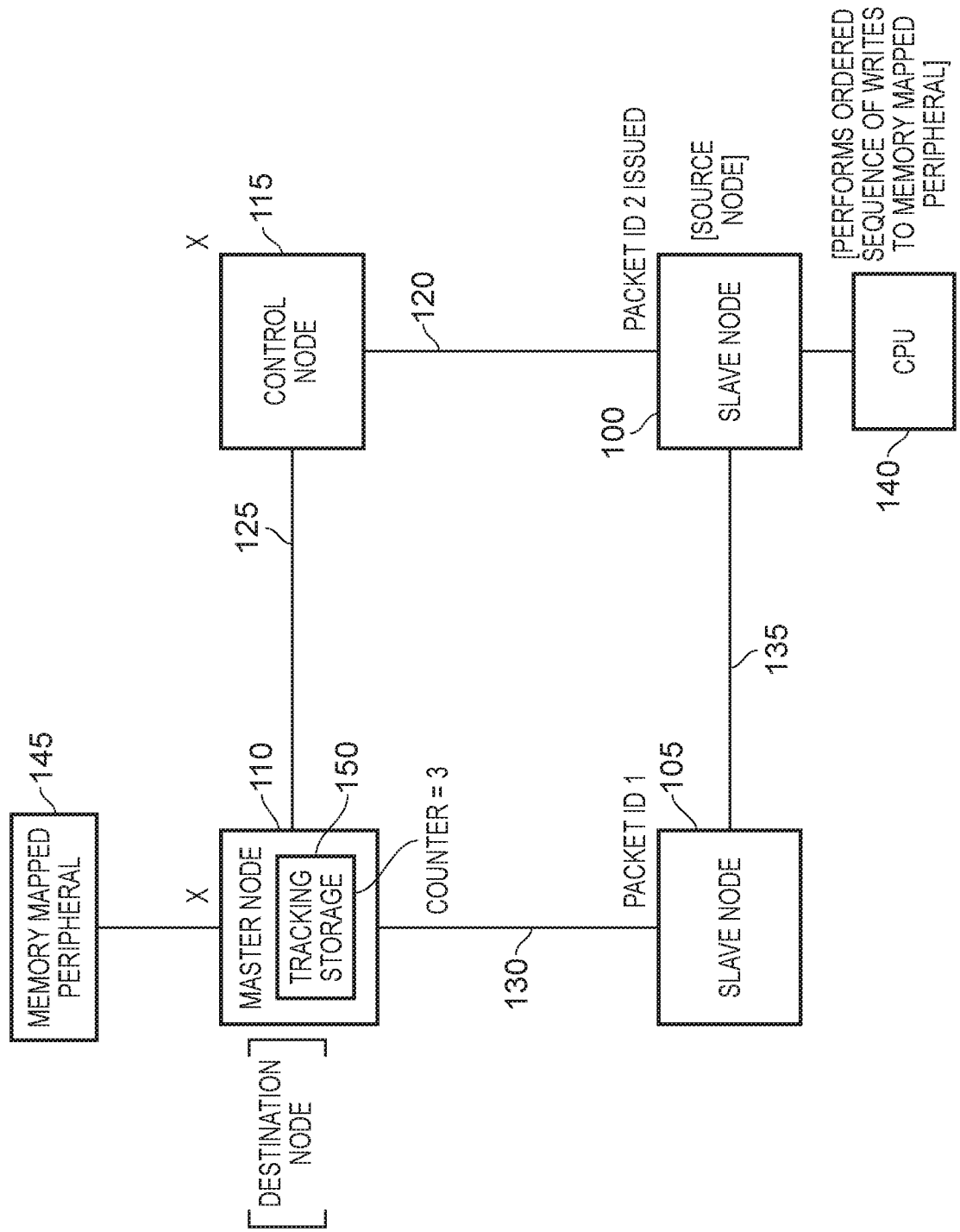

FIG. 8B illustrates the next cycle, where packet ID 1 is propagated on to slave node 105, and the source node 100 issues the next packet, having packet ID 2. The counter within the tracking storage 150 is decremented by one to show the elapse of one cycle.

Figure 8C:
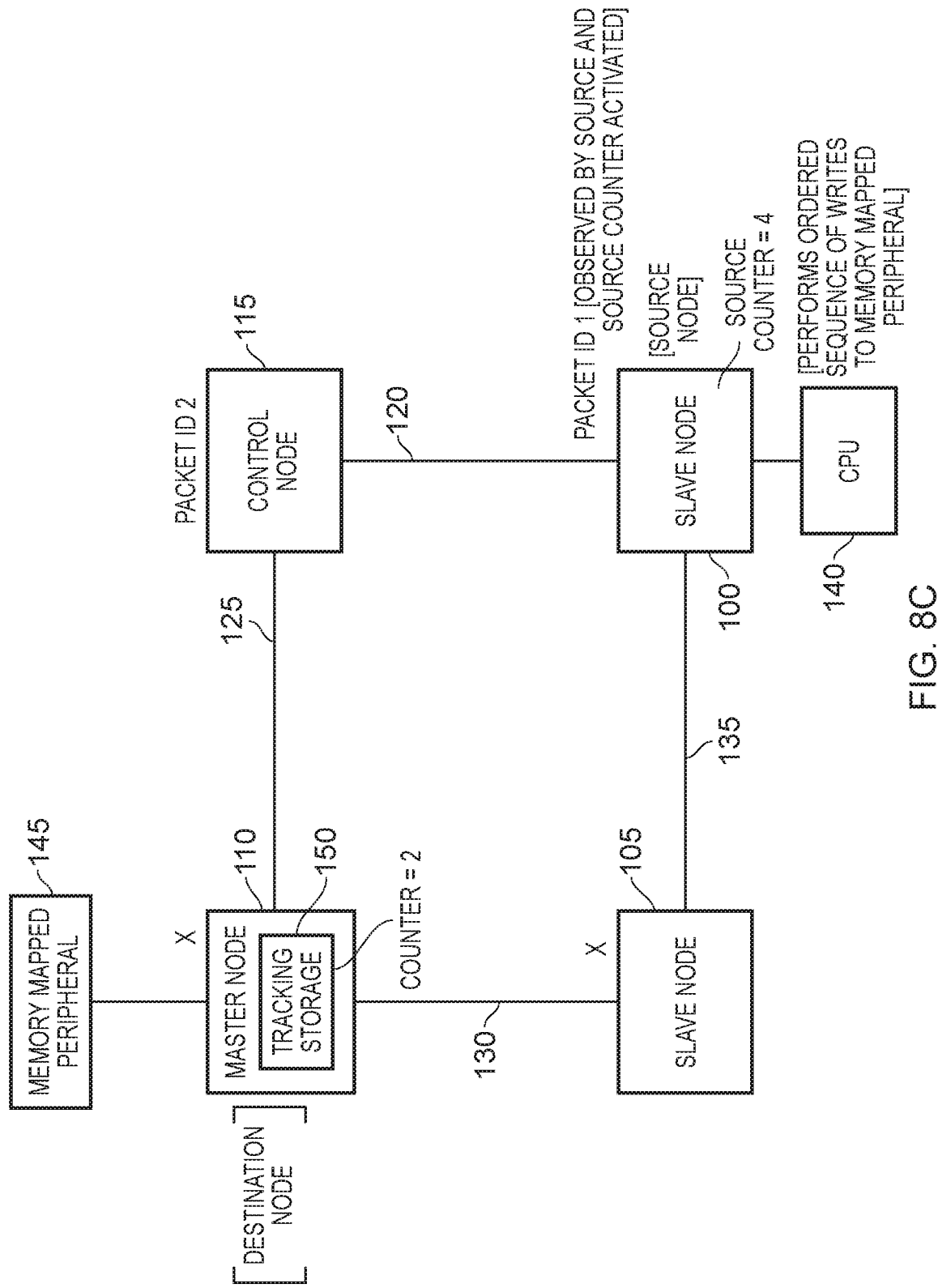

As shown in FIG. 8C, in the next cycle packet ID 1 is propagated on to the source node 100, and packet ID 2 is propagated on to the control node 115. The counter in the tracking storage is decremented again, so that the counter now has a value of two. Since the source node now observes packet ID 1 being routed past it, indicating that that packet is being respun, it activates its counter, which will be referred to herein as the source counter, and accordingly that counter takes an initial value of four.

Figure 8D:
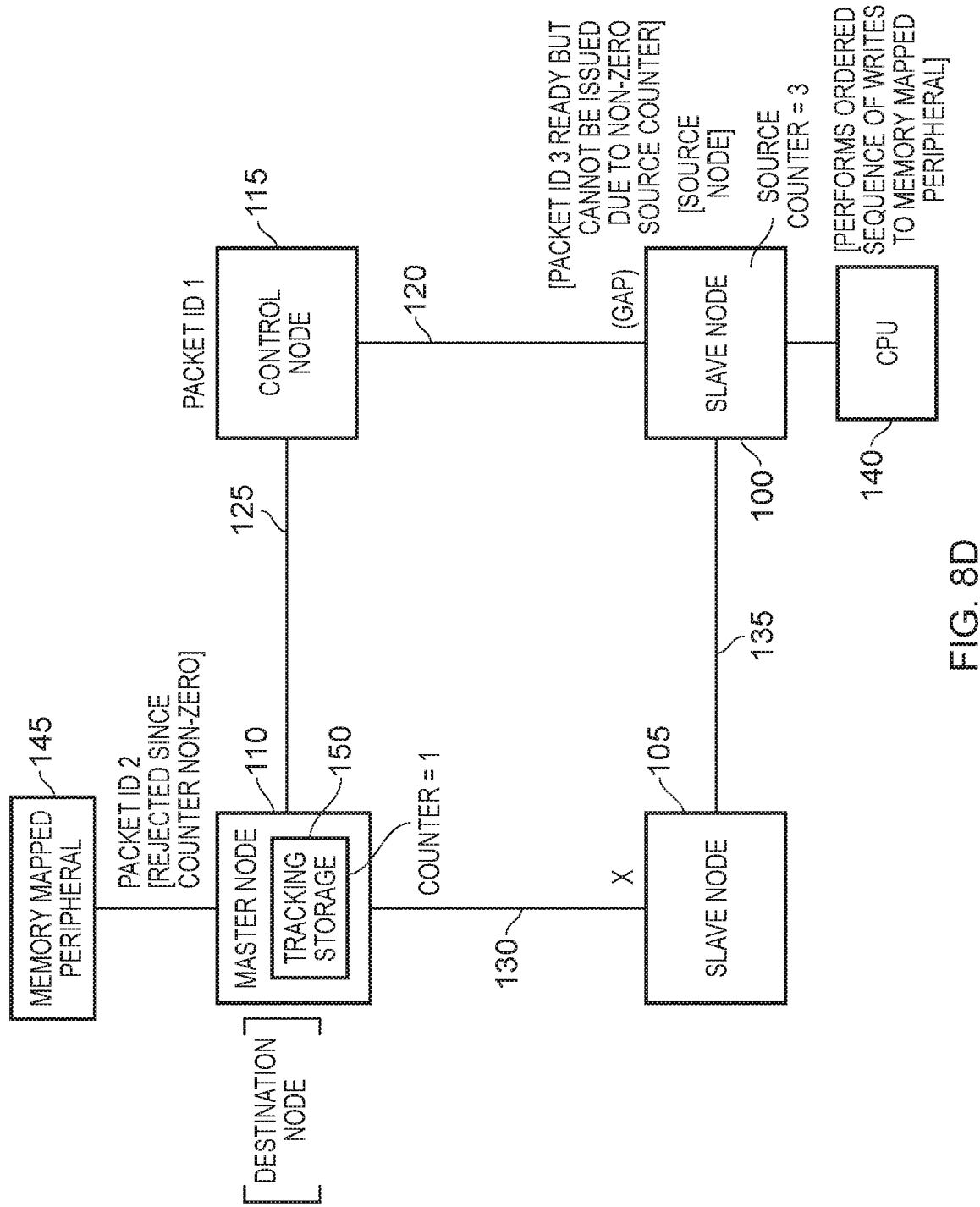

As shown in FIG. 8D, in the next cycle packet ID 2 is presented to the destination node 110, but has to be rejected since the counter in the tracking storage entry is non-zero. Packet ID 1 is now at control node 115, and the source node is assumed to be presented with a gap, allowing it in principle to issue another packet on to the ring network. It is assumed at this point that packet ID 3 is ready, but it will not be issued due to the non-zero state of the source counter. At the stage show in FIG. 8D, the counter in the tracking storage is decremented to a value of one, and the source counter in the source node 100 is decremented to a value of three.

Figure 8E:
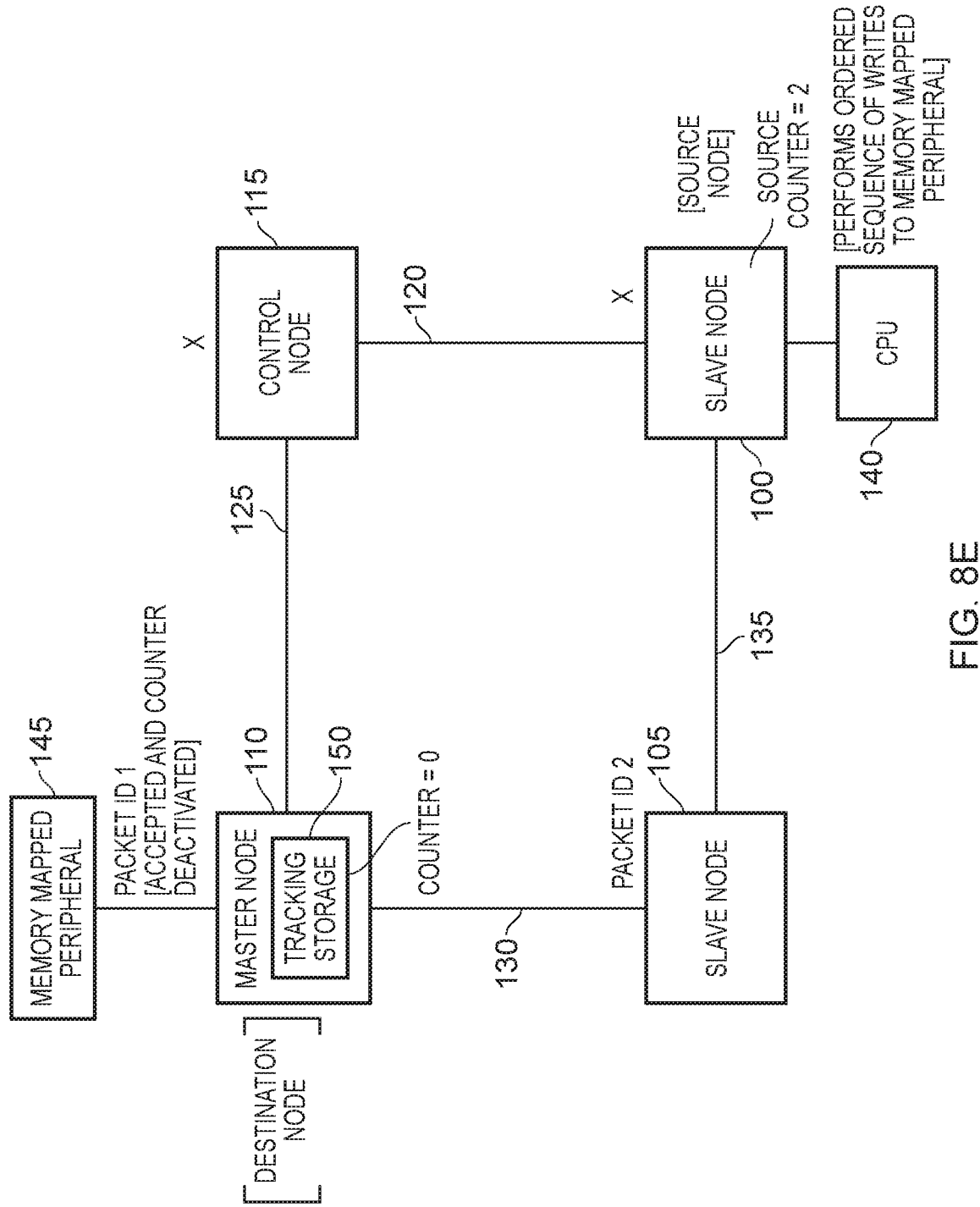

FIG. 8E illustrates the next cycle, where packet ID 1 is presented back to the destination node 110. At this point, the counter is decremented to zero, and accordingly the packet ID 1 is able to be accepted assuming the destination node 110 is now in a position to accept that packet. In the example shown, it is assumed that the destination node is able to accept the packet, and accordingly packet ID 1 is accepted, and the counter in the tracking storage is deactivated. Packet ID 2 is now being respun, and in this cycle is presented to the slave node 105. The source node counter is decremented by one to a value of two, as shown in FIG. 8E. Again, the slave node has packet ID 3 ready to issue, but even if there is a gap at the point shown in FIG. 8E, such that the source node could issue packet ID 3 on to the ring network, it does not do so because the source counter is non-zero. This addresses the earlier discussed problem, since if at this point the slave node did issue packet ID 3, then packet ID 3 would reach the destination node 110 before packet ID 2, and could be accepted since the destination node 110 would no longer have an active counter entry in the tracking storage. This would violate the ordering constraints. However, using the technique described herein the source node 110 will still be inhibited from adding the additional packet on to the ring network at the time shown in FIG. 8E.

Figure 8F:
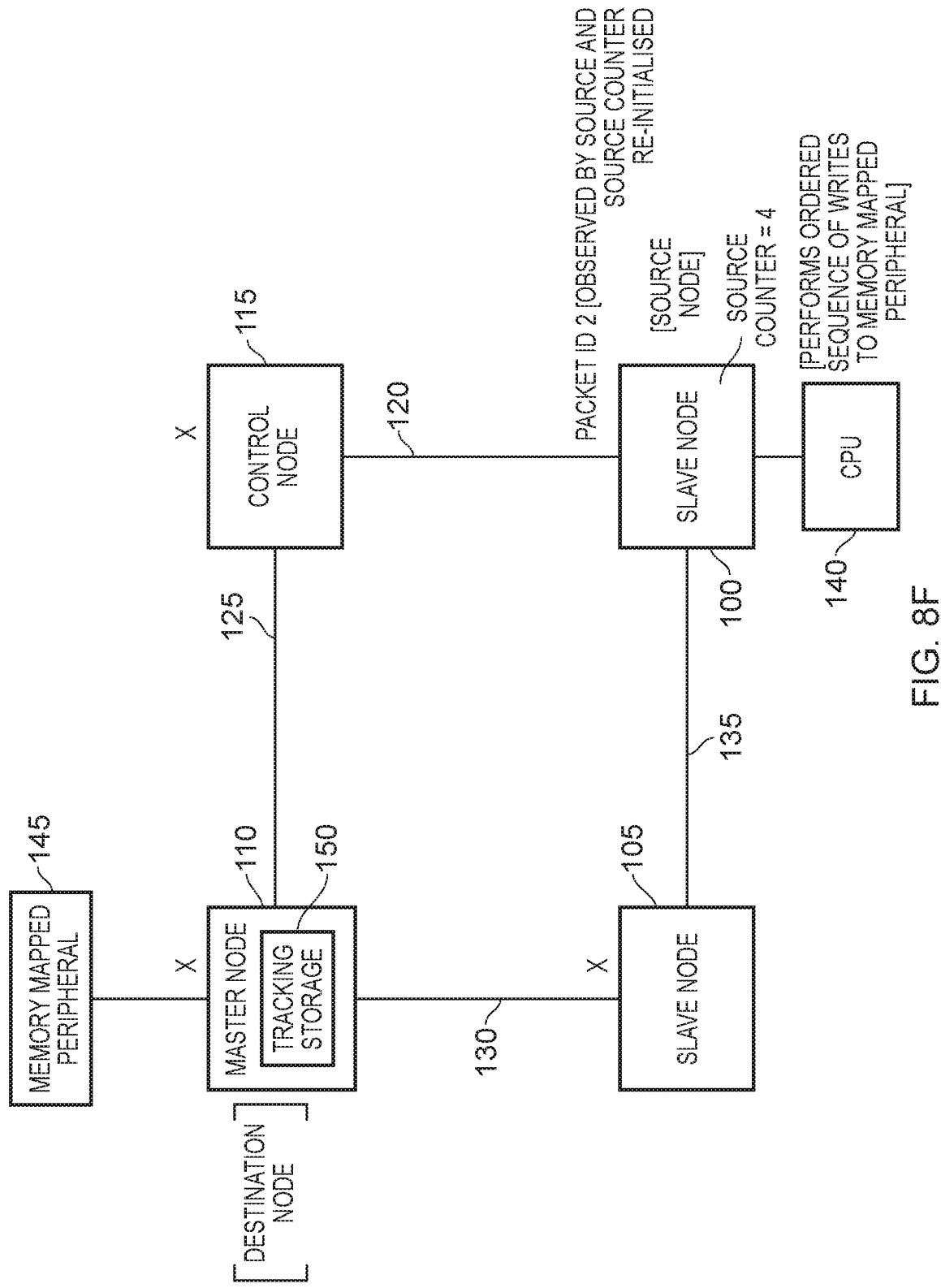

As shown in FIG. 8F, in the next cycle packet ID 2 is observed at source node 100, and this causes the source counter to be re-initialised back to a value of four.

FIG. 8G illustrates the position two cycles after that shown in FIG. 8F, where packet ID 2 is now presented to the destination node 110. At this point, it is assumed that the destination node accepts packet ID 2. The source counter at this time will now have been decremented to a value of two, which will continue to inhibit the source node from issuing further packets of the ordered sequence.

Figure 8H:
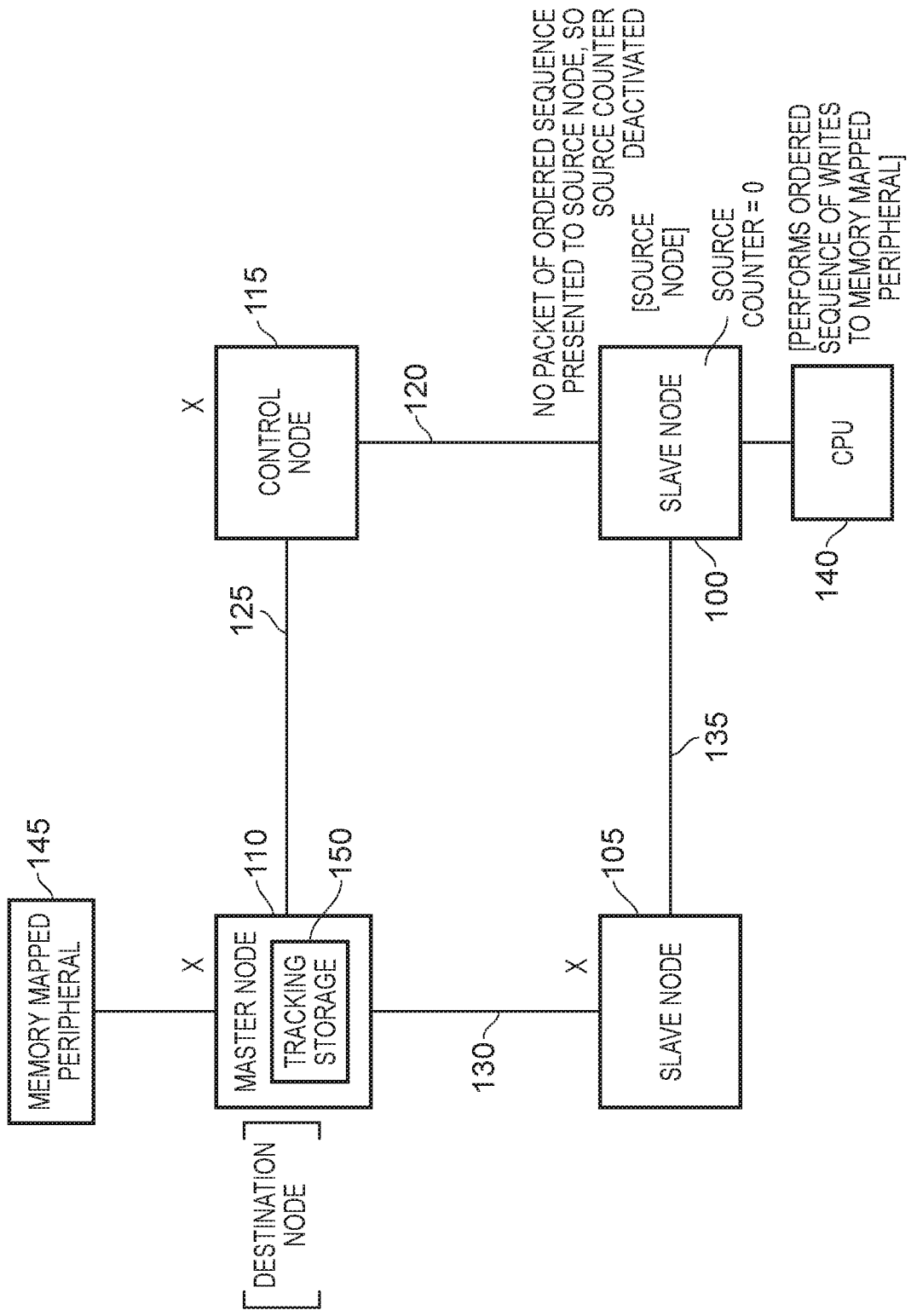

FIG. 8H then shows the position two cycles after FIG. 8G, where the source counter has now been decremented to zero, and accordingly the process of FIG. 6B is implemented at the source node. At this point it will be determined that no packet of the ordered sequence is presented to the source node, and hence the source counter will be deactivated, re-enabling the source node to add further packets of the ordered sequence on to the ring network.

Figure 8I:
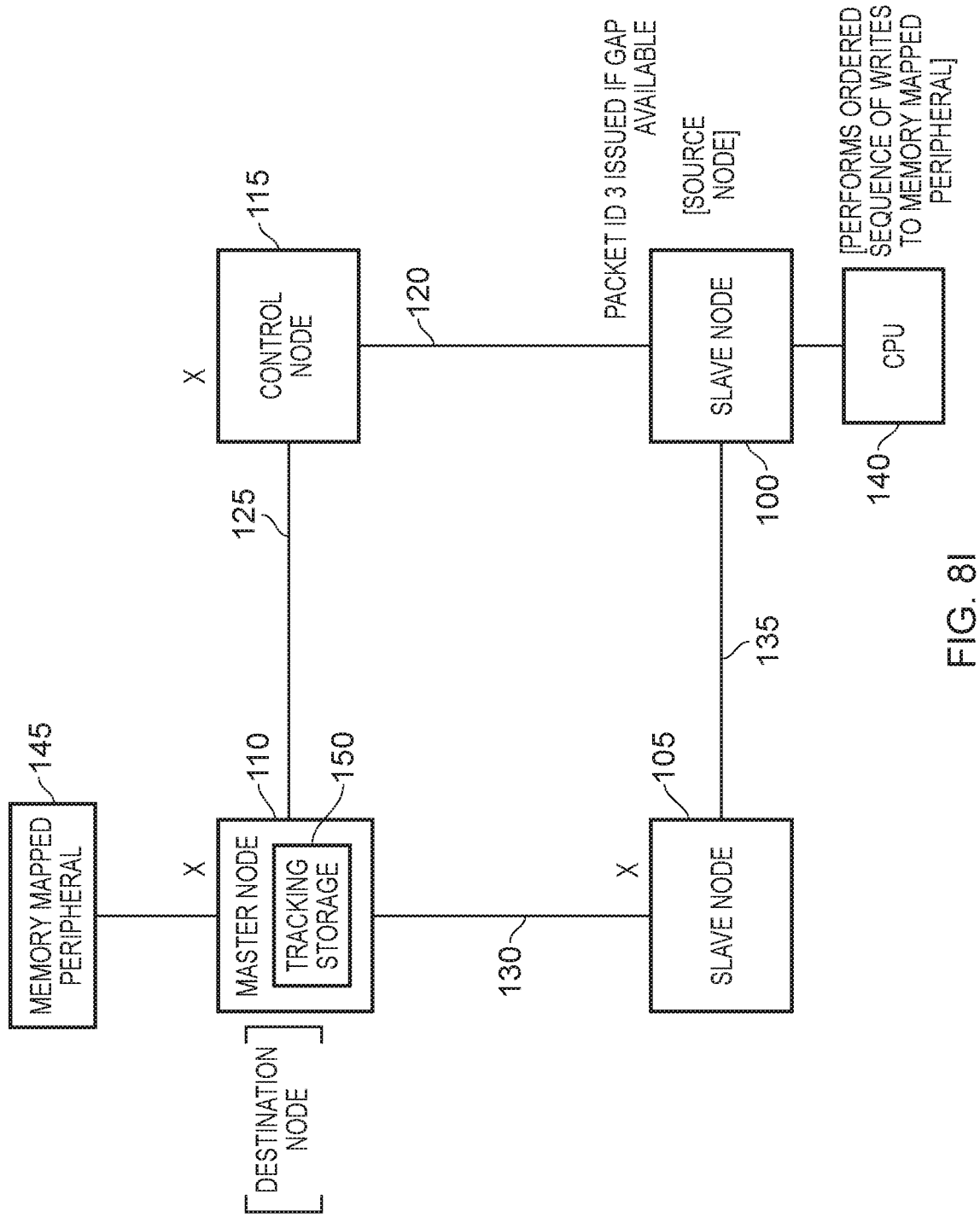

Accordingly, as shown in FIG. 8I, in the next cycle the source node 100 can issue packet ID 3 on to the ring network assuming there is a gap available to the source node at that point. In due course that packet will then be received by the destination node.

As will be seen from the above discussed FIGS. 8A to 8I, by employing the techniques described herein, it is possible to increase the efficiency of the handling of ordered sequences of packets within a ring network, whilst ensuring that the ordering constraints are observed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An interconnect comprising:
a plurality of nodes;
a ring network to which each of the nodes is connected to allow packets to be transmitted between nodes;
for an ordered sequence of packets one of the nodes being arranged as a source node to add each packet of the ordered sequence onto the ring network and another of the nodes being arranged as a destination node to remove each packet of the ordered sequence from the ring network;
wherein:
the source node is enabled, by default, to add a packet of the ordered sequence onto the ring network without waiting for a previously added packet of the ordered sequence to be removed from the ring network by the destination node;
when the destination node is unable to accept a given packet of the ordered sequence that is currently being presented to the destination node by the ring network, that given packet remains on the ring network and continues to be transmitted around the ring network such that after a respin period that given packet will be presented again to the destination node;
the destination node is arranged to prevent acceptance of at least any other packets of the ordered sequence subsequently presented to the destination node by the ring network until the destination node has accepted the given packet following at least one respin period;
the source node is arranged to monitor each packet routed via the source node by the ring network; and
the source node is arranged, responsive to detecting any packet of the ordered sequence being routed via the source node by the ring network, to disable the adding of at least any further packets of the ordered sequence to the ring network for at least one respin period.

2. The interconnect as claimed in claim 1, wherein the destination node is arranged, until the destination node has accepted the given packet following the at least one respin period, to prevent acceptance of any packet whose destination is that destination node.

3. The interconnect as claimed in claim 1, wherein the destination node has tracking storage to store information to enable the given packet to be identified when it is re-presented to the destination node after the respin period.

4. The interconnect as claimed in claim 3, wherein the information stored in the tracking storage is a packet identifier for the given packet.

5. The interconnect as claimed in claim 3, wherein:
the ring network is arranged so that a packet that is not accepted by any of the nodes will make a full traversal of the ring network in N cycles; and
the information stored in the tracking storage is a count value that is used to track N cycles following the given packet not being accepted by the destination node.

6. The interconnect as claimed in claim 1, wherein:
each packet has a flag to identify whether that packet is a packet of the ordered sequence, and the destination node is arranged, until the destination node has accepted the given packet following the at least one respin period, to prevent acceptance of at least any other packet presented to the destination node by the ring network whose flag indicates that that packet is one of the packets of the ordered sequence.

7. The interconnect as claimed in claim 3, wherein the ring network is enabled to transmit packets of a plurality of ordered sequences at any point in time, and the information stored in the tracking storage includes a sequence identifier to identify the ordered sequence to which the given packet belongs.

8. The interconnect as claimed in claim 7, wherein each packet has a sequence identifier field to identify whether that packet is a packet of an ordered sequence, and in the event that that packet is a packet of an ordered sequence to identify which ordered sequence that packet belongs to.

9. The interconnect as claimed in claim 7, wherein each source node is restricted to only process one ordered sequence at any point in time, and the sequence identifier comprises a source identifier determined from a source identifier field of the given packet.

10. The interconnect as claimed in claim 1, wherein:
when, following elapse of the at least one respin period after a most recently detected packet of the ordered sequence had caused the source node to disable the adding of any further packets of the ordered sequence to the ring network, the source node observes that that most recently detected packet is no longer routed via the source node, the source node is re-enabled to add further packets of the ordered sequence to the ring network.

11. The interconnect as claimed in claim 10, wherein:
the ring network is arranged so that a packet that is not accepted by any of the nodes will make a full traversal of the ring network in N cycles;
the source node maintains a counter which is initialised each time a packet of the ordered sequence is detected as being routed via the source node by the ring network; and
the source node is arranged when a current value of the counter indicates elapse of N cycles, to re-enable the adding of further packets of the ordered sequence to the ring network when it is determined that a packet of the ordered sequence is not currently being presented to the source node.

12. The interconnect as claimed in claim 10, wherein:
each packet has a source identifier field to identify the source node that added the packet to the ring network; and
the source node is arranged to monitor the source identifier field of each packet routed via the source node by the ring network in order to detect when any packet of the ordered sequence is routed via the source node by the ring network.

13. The interconnect as claimed in claim 12, wherein:
each packet has a flag to identify whether that packet is a packet of the ordered sequence, and the source node is arranged to monitor the source identifier field and the flag of each packet routed via the source node by the ring network in order to detect when any packet of the ordered sequence is routed via the source node by the ring network.

14. The interconnect as claimed in claim 10, wherein the source node is arranged, responsive to detecting any packet of the ordered sequence being routed via the source node by the ring network, to disable the adding of any further packets to the ring network for the at least one respin period.

15. A method of operating an interconnect that has a plurality of nodes, and a ring network to which each of the nodes is connected to allow packets to be transmitted between nodes, the method comprising:

for an ordered sequence of packets, arranging one of the nodes as a source node to add each packet of the ordered sequence onto the ring network and another of the nodes as a destination node to remove each packet of the ordered sequence from the ring network;

enabling the source node, by default, to add a packet of the ordered sequence onto the ring network without waiting for a previously added packet of the ordered sequence to be removed from the ring network by the destination node;

when the destination node is unable to accept a given packet of the ordered sequence that is currently being presented to the destination node by the ring network, retaining that given packet on the ring network and continuing to transmit that given packet around the ring network such that after a respin period that given packet will be presented again to the destination node; and preventing the destination node from accepting at least any other packets of the ordered sequence subsequently presented to the destination node by the ring network until the destination node has accepted the given packet following at least one respin period;

monitoring, by the source node, each packet routed via the source node by the ring network; and responsive to detecting any packet of the ordered sequence being routed via the source node by the ring network, disabling the adding of at least any further packets of the ordered sequence to the ring network for at least one respin period.

16. An interconnect comprising:

a plurality of node means, each of the node means including at least one of a processor and a memory;

a ring network means to which each of the node means is connected to allow packets to be transmitted between the node means;

for an ordered sequence of packets, one of the node means being arranged as a source node means for adding each packet of the ordered sequence onto the ring network means and another of the node means being arranged as a destination node means for removing each packet of the ordered sequence from the ring network means;

wherein:

the source node means is enabled, by default, for adding a packet of the ordered sequence onto the ring network means without waiting for a previously added packet of the ordered sequence to be removed from the ring network means by the destination node means;

when the destination node means is unable to accept a given packet of the ordered sequence that is currently being presented to the destination node means by the ring network means, that given packet remains on the ring network and continues to be transmitted around the ring network means such that after a respin period that given packet will be presented again to the destination node means;

the destination node means for preventing acceptance of at least any other packets of the ordered sequence subsequently presented to the destination node means by the ring network means until the destination node means has accepted the given packet following at least one respin period;

the source node means is arranged to monitor each packet routed via the source node means by the ring network means; and the source node means is arranged, responsive to detecting any packet of the ordered sequence being routed via the source node means by the ring network means, to disable adding of at least any further packets of the ordered sequence to the ring network means for at least one respin period.

* * * * *